United States Patent
Wickers

[15] 3,663,013
[45] May 16, 1972

[54] WORK POSITIONING DEVICES
[72] Inventor: Francis A. Wickers, Beverly, Mass.
[73] Assignee: USM Corporation, Boston, Mass.
[22] Filed: June 15, 1970
[21] Appl. No.: 46,212

[52] U.S. Cl. .................................................. 271/59, 271/52
[51] Int. Cl. ........................................ B65h 7/10, B65h 9/16
[58] Field of Search ............... 271/49, 52, 59; 198/1, 33 AB, 198/127, 33 AD

[56] References Cited

UNITED STATES PATENTS 3,442,400  5/1969  Roth .................................. 198/33 AB

FOREIGN PATENTS OR APPLICATIONS 1,154,964  6/1969  Great Britain ......................... 271/49

Primary Examiner—Edward A. Sroka
Attorney—Richard A. Wise, Richard B. Megley and Carl E. Johnson

[57] ABSTRACT

A bottom feeding mechanism, comprised of a plurality of caged balls and an endless belt in frictional driving contact therewith, is provided with an edge gage for uniformly positioning work pieces, especially flexible sheet material such as fabric, fed onto the balls. In addition to adjustably determining a selected marginal position and/or a line of feeding, for instance as required for hemming and/or stitching machines, the device is adaptable for turning over successive work pieces and aligning them in uniform manner.

2 Claims, 7 Drawing Figures

PATENTED MAY 16 1972 3,663,013

Inventor
Francis A. Wickers
By his Attorney
Carl E. Johnson.

WORK POSITIONING DEVICES

BACKGROUND OF THE INVENTION

Repetitive manual operation on flexible work pieces such as limp garment parts and the like are usually tedious and burdensome. As a consequence many assembly and other operations in the stitching field and elsewhere in manufacture which require accurate location of work pieces relative to other work pieces, or with respect to machines for operating thereon, may result in slow and non-uniform or defective production. Various systems have been devised for conveying work pieces along a general line of production and through successive machine stations each requiring that, for optimum results, the work move in a predetermined path relative to the machines. Whether serving a single machine or a plurality, it is found that an automatic means for selectively positioning, i.e. aligning, orienting angularly, or inverting is a great help toward increasing output and insuring against inadvertent mispositioning of the work with respective to tools operative thereon.

Usage of gages in combination with conveyors, often a series of parallel cylindrical rollers, for orienting and aligning work is well known. Endless conveyors are adapted to carry and move flexible work along the general path of operation, some other mechanism being actuated to cause the work path to be altered as circumstances may require. When, as chiefly contemplated in the present invention, the work to be positioned is of flat, thin, limp and easily deformed character as is the case with many sheet materials of plastic, paper, fabric or the like, it is essential to prevent the work from getting wrinkled, rumpled, or folded and at least maintain the work pieces to be processed in a reasonably outspread condition. A common difficulty with moving sheet material by means of parallel axis rollers, for instance, is that all portions of the work resist adjustive movement in any direction not normal to their axes. In contrast thereto the sheet moving means of the present invention disposed the work in any desired position determined by an edge gage and yieldably holds an edge of the work positioned as desired against a stop or stops without distorting contour of the edge.

SUMMARY OF THE INVENTION

In view of the foregoing it is an object of this invention to provide an improved device for selectively orienting sheet material in its own general plane.

Another object of the invention is to provide an orienting device for work pieces which is adapted for use in successively receiving them from a conveyor and positioning them for further movement along a path in desired angular relation to the path of feed of said conveyor or with respect to an operating tool.

Still another object of this invention is to provide an independently operative frictional orienting device for predeterminedly positioning and/or moving flexible work such as a piece of fabric relative to the operating zone of a tool, for instance the stitch forming locality of a sewing machine.

In accordance with these objects a feature of the invention resides in the combination with an edge gage means of a friction feeding mechanism comprising a driving means and a plurality of balls loosely caged for frictional engagement with the driving means, the balls being arranged to frictionally move a flexible work piece substantially in its own plane and into contact with the gage means. Preferably, and as herein shown, the balls are disposed horizontally for support of the work piece to be oriented thereby and hence they each apply light friction to the underside of the work to bottom feed it in the direction dictated by the direction of movement of the driving means. The latter is desirably in the form of an endless conveyor belt.

As it is envisioned that the orienting device of this invention will be versatile both as to the nature of the work to be oriented, which of course need not be flexible or only so in different degrees, and as to the nature of the operation and process to be performed at a station wherein the work is to be oriented, the speed of the driving means may be adjusted as desired, and the balls may be interchanged for ones providing a suitable different degree of friction or particular work surfaces to be positioned. Preferably, in one aspect of the invention, an edge gage extends along a side margin of the ball cage at an angle to the conveyor belt drive to determine the exact straight line of feed to be imparted to each successive rectilinear work piece.

Additionally if desired, for insuring a selected linear path of feed spaced from the side gage, an angular or work turning gage may be adjustably mounted and arranged over the balls to be engaged by the successive work pieces, the turning gage having one surface for causing the work to be shifted laterally of the general direction of feed and another surface angularly related to the first for defining the proper realignment of the work during further feeding movement. It will become clear, too that the work positioning device of this invention may advantageously be used with end gages and moreover can perform work inverting together with positioning when desired.

BRIEF DESCRIPTION OF THE DRAWINGS

The foregoing and other features of the invention will now be more particularly described in connection with an illustrative automatic work positioning device in which the invention is embodied, and with reference to the accompanying drawings, in which.

DESCRIPTION OF THE PREFERRED EMBODIMENTS

Figure 1:
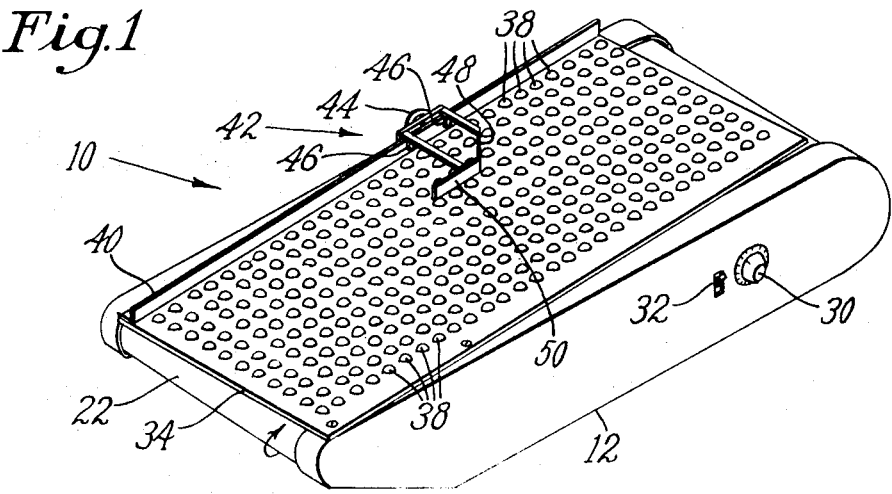
FIG. 1 is a perspective view of the work positioner.
Figure 2:
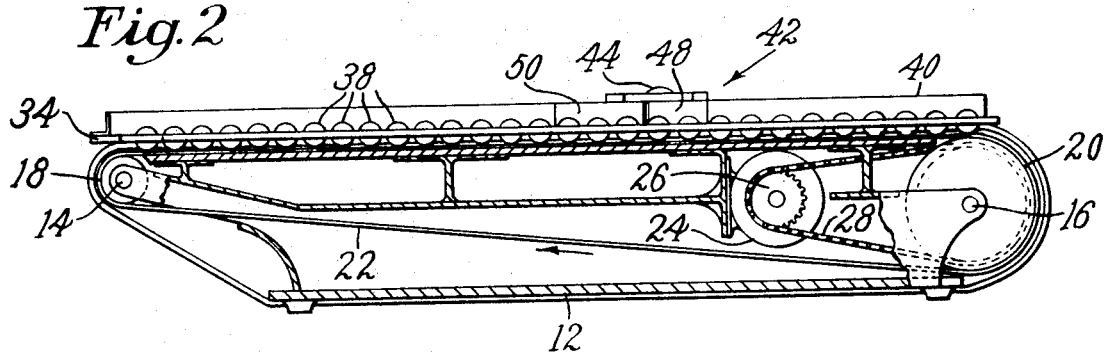
FIG. 2 is a view in side elevation, largely in longitudinal section, of the device shown in FIG. 1 and indicating its endless drive means.

The illustrative assembly 10 shown in FIG. 1 is intended to be a generally useful, substantially self-sufficient unit capable of being mounted in tandem with the output end of a conveyor and/or moved adjacent to the operating zone of a particular machine. Thus for instance, the assembly 10 may be disposed to receive successive work pieces F (FIGS. 4–7) to be oriented in their own general plane with respect to an operating tool, for example the needle of a sewing machine (not shown). The assembly 10 comprises a generally rectangular hollow frame 12 in opposite ends of which there are journaled cross shafts 14, 16 (FIG. 2), respectively, for rotatably supporting end pulleys 18, 20 for an endless drive belt 22. This belt is shown as being driven from a motor 24 secured within the frame 12 and operatively connected to the belt 22 by means of a sprocket 26 and a drive chain 28. Preferably the operating speed of the motor 24 and hence the belt 22 is variable by means of a control knob 30 (FIG. 1) and a stop-start switch 32.

Figure 3:
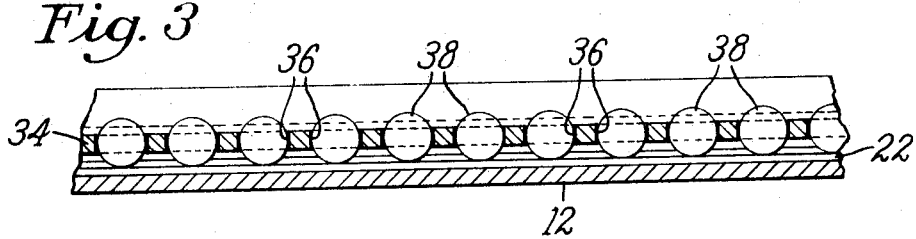
FIG. 3 is an enlarged section of a portion of a ball cage shown in FIGS. 1 and 2.
Figure 4:
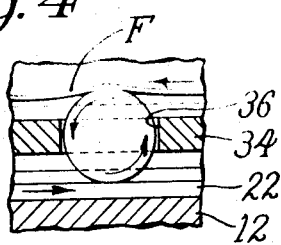
FIG. 4 is a further enlarged detail of a single ball shown in FIG. 3 and frictionally contacting both the drive means and a work piece to be positioned.
Figure 5:
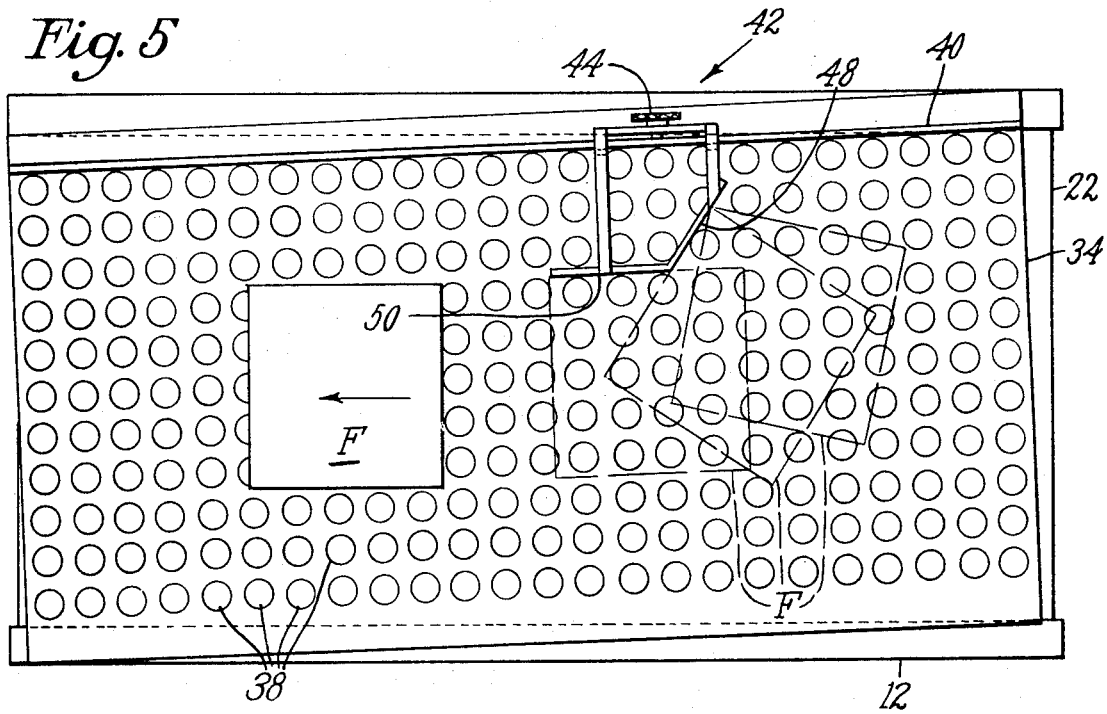
FIG. 5 is a plan view showing sequential action of a work turning gage.

Secured to the top of the frame 12, usually in horizontal disposition, is a ball cage or perforate plate 34 which extends in spaced parallel relation to the upper reach of the belt 22. As indicated in FIGS. 3 and 4 the cage 34 is formed with a plurality of circular holes 36, preferably uniformly spaced apart, for respectively accommodating a plurality of freely rotatable balls 38. The diameter of the holes 36 is selected to enable the bottoms of the balls 38 to be held in frictional engagement with the belt 22, while the tops of the balls define a general plane wherein they may apply light friction to the underside of the work F to be oriented. Incidentally, for use in positioning most fabrics and the like the balls 38 may desirably be on the order of ¾ to 1 ¼ inch diameter, and a relatively inexpensive yet satisfactory solution is to employ the marbles of glass commonly used as playthings. As shown in FIG. 4 the direction of motion imparted or tending to be imparted by revolution of each ball 38 to the work is opposite to the direction of the driving reach of the belt 22, and limpness in the work piece allowing it slightly to conform to the ball curvature may assist in developing effective feeding force.

Figure 6:
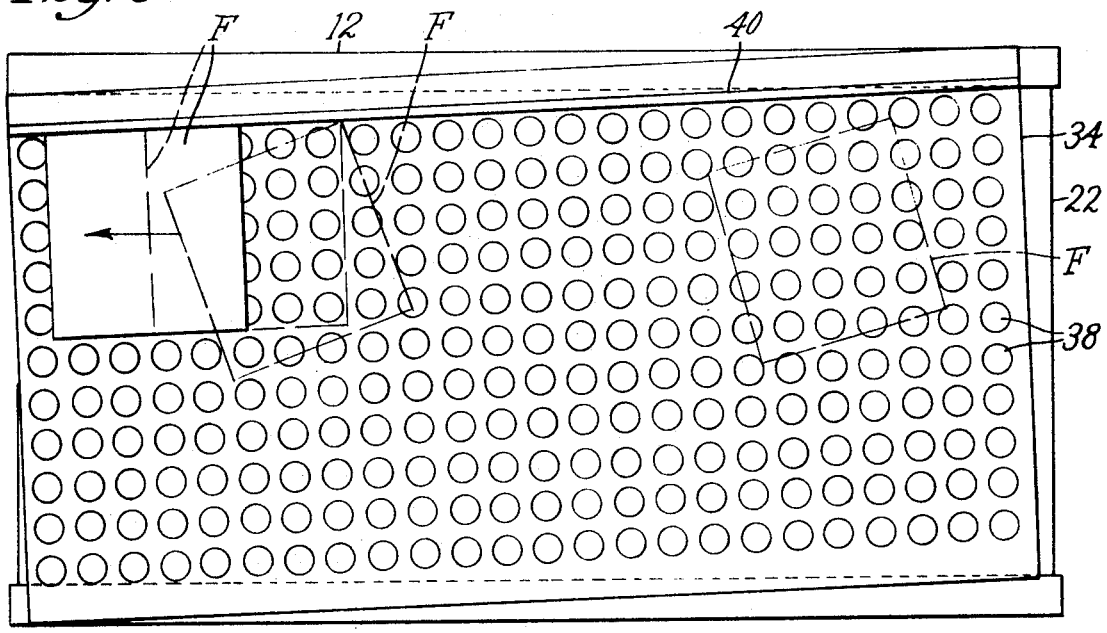
FIG. 6 is a view similar to FIG. 5 but showing sequential operation of a straight side gage.

A straight side gage 40 (FIGS. 1–6) is herein shown as being secured to a longitudinal edge of the ball cage 34 which is itself disposed at a selected angle relative to the general path of movement of the belt 22. (An alternate construction (not shown) is to adjustably mount the gage 40 on the frame 12 so that angularity of the gage relative to the path of the belt may be independently selected without altering the position of the cage 34). It will be understood that, in view of the universal freedom of rotation of the balls 38 in their sockets, they collectively exert a frictional bottom feeding force on each work piece F received at the right-hand end of the device (as viewed in FIGS. 1 and 2). Accordingly, assuming an optional turning gage 42 (FIGS. 1, 2 and 5) shown therein and later referred to is omitted, the work piece regardless of its initial orientation on the right-hand balls 38, will be bodily moved along substantially in its plane until an edge of the work engages the side gage 40. At this point, the angle of incidence between the gage 40 and a side of the work F being small, a straight side of the work piece will be urged by the balls along and into tangent relation to the gage 40. In this manner, for example, a work piece margin may be progressively advanced in a desired straight line with respect to a tool (not shown) operable thereon. In the event the angle of incidence of a work piece relative to the gage 40 is larger, i.e., has less initial coincidence, as shown in FIG. 6 for instance, the work will be caused by the balls to move clockwise in its plane about its locality of contact with the gage before being urged to assume a fixed feed path parallel to and determined by the gage 40. In FIG. 6, three sequential positions of the work piece F are shown in dash lines and its final oriented feed path indicated by an arrow in its full line position.

The turning gage 42 may be mounted on the side gage 40 whether the latter is secured to the frame or the cage 34, or the gage 42 may be employed in lieu of the gage 40 and be secured directly on the frame 12. Preferably the turning gage 42 is adjustably slidable or otherwise positioned lengthwise of the cage, the arrangement herein shown being such that a thumb screw 44 (FIG. 5) threadedly extending through an external portion of the gage cooperates with its depending projections 46, 46 (FIG. 1) to clamp the gage 42 in selected position. The gage 42 has one work-engaging surface 48 (FIG. 5) disposed to engage successive oncoming work pieces F. Upon initial work engagement the influence of the balls 38 is to turn the abutting work edge parallel and tangent to the surface 48 (as indicated by the dash lines in FIG. 5) whereupon the work piece is urged therealong until it pivots at the intersection of the surface 48 with an angularly related work-engaging surface 50. The latter then determines the selected straight path of feed and orientation of the work as shown by the work piece indicated in full lines.

It will be understood that various shapes and types of both side and/or edge gages may be used in combination with the described friction feeding and orienting means, the particular gage means usually being determined by the function of the machine station wherein the orienting device is located and the shape or shapes of work piece to be processed.

Figure 7:
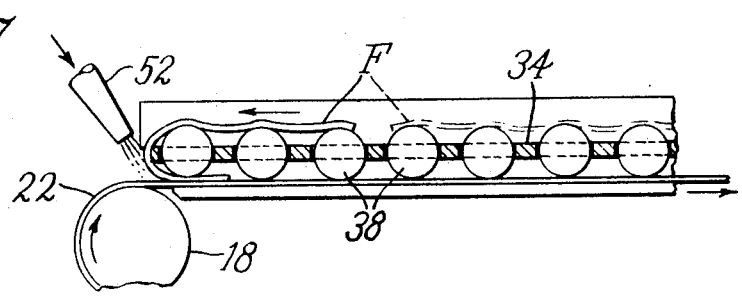
FIG. 7 is a view corresponding to the left-hand end of the device of FIG. 2 modified to progressively invert a flexible work piece as well as orient it.

As shown in FIG. 7 the orienting device may also be adapted to invert the work pieces when oriented. For this purpose work deflecting means herein shown as at least one nozzle 52 is provided for directing a stream of air upon the leading portions of successive work pieces. As a consequence the deflected work piece F is caused to reverse direction and pass under the balls 38 and in direct contact with the upper reach of the belt 22. The nozzle 52 may be operated continuously if all pieces F are to be inverted, or may operate intermittently, for instance to invert alternate pieces, or may serve as a detector-controlled ejector for causing only faulty or other selected work pieces to be inverted and separated from pieces which are found acceptable and allowed to advance only to the left.

Having thus described my invention, what I claim as new and desire to have secured by Letters Patent of the United States is:

1. Work orienting mechanism comprising, in combination, an endless drive means operable in one direction, a ball cage mounted for loosely retaining a plurality of balls in frictional engagement with the drive means while partly exposed for movable supporting a work piece to be positioned, an edge gage fixedly extending into at least a portion of the path of the work piece thus supported when the balls are caused by said drive means frictionally to feed the work piece oppositely from said one direction, and a deflector means disposed adjacent to a margin of said cage to deflect the work piece as it passes from its support on said balls whereby the work piece is inverted and reversed for feeding in contact with said drive means.

2. The mechanism of claim 1 wherein the deflector means is in the form of a nozzle for directing a stream of air against the work.

* * * * *